United States Patent
Meng

(10) Patent No.: US 10,367,579 B2
(45) Date of Patent: Jul. 30, 2019

(54) DEVICE AND METHOD OF HANDLING COMMUNICATION OPERATION

(71) Applicant: HTC Corporation, Taoyuan (TW)

(72) Inventor: Ling-San Meng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 165 days.

(21) Appl. No.: 15/352,593

(22) Filed: Nov. 16, 2016

(65) Prior Publication Data

US 2017/0149494 A1 May 25, 2017

Related U.S. Application Data

(60) Provisional application No. 62/257,739, filed on Nov. 20, 2015.

(51) Int. Cl.
| | |
|---|---|
| *H04B 7/26* | (2006.01) |
| *H04L 1/00* | (2006.01) |
| *H04L 1/18* | (2006.01) |
| *H04W 72/12* | (2009.01) |
| *H04L 27/26* | (2006.01) |

(52) U.S. Cl.
CPC ......... *H04B 7/2662* (2013.01); *H04L 1/0018* (2013.01); *H04L 1/1812* (2013.01); *H04W 72/1289* (2013.01); *H04L 27/2601* (2013.01); *H04W 72/1263* (2013.01)

(58) Field of Classification Search
CPC ... H04B 7/2662; H04L 1/1812; H04L 1/0018; H04L 27/2601
See application file for complete search history.

(56) References Cited

U.S. PATENT DOCUMENTS

| | | | |
|---|---|---|---|
| 2015/0334685 A1 | 11/2015 | Ji | |
| 2015/0334729 A1* | 11/2015 | Ji | H04W 72/0453 370/336 |
| 2016/0095105 A1* | 3/2016 | Chen | H04W 72/0413 370/329 |
| 2016/0226650 A1* | 8/2016 | Chen | H04L 5/14 |

(Continued)

OTHER PUBLICATIONS

Search Report dated Apr. 10, 2017 for EP application No. 16199485.0, pp. 1-7.

(Continued)

*Primary Examiner* — Hassan Kizou
*Assistant Examiner* — Hector Reyes
(74) *Attorney, Agent, or Firm* — Winston Hsu

(57) ABSTRACT

A network transmitting a duration of a subframe of a first type to a communication device; transmitting a multiplexing scheme for the subframe of the first type and a subframe of a second type to the communication device, wherein the duration of the subframe of the first type is shorter than a duration of the subframe of the second type; determining a duration of a subframe of a third type, wherein the duration of the subframe of the second type is not an integral multiple of the duration of the subframe of the first type; transmitting the duration of the subframe of the third type to the communication device; and performing the communication operation in a plurality of subframes of the first type in at least one subframe of the third type according to the multiplexing scheme via a physical channel.

20 Claims, 7 Drawing Sheets

(56) References Cited

U.S. PATENT DOCUMENTS

2018/0041325 A1* 2/2018 Lee ...................... H04L 5/0087

OTHER PUBLICATIONS

Intel Corporation, "Discussion on TTI Shortening", 3GPP TSG RAN WG1 Meeting #83, R1-156540, Nov. 15-22, 2015, Anaheim, USA, XP051002970, pp. 1-4.
3GPP TSG RAN Meeting #67 RP-150465 Mar. 9-12, 2015.
3GPP TS 36.212 V12.5.0 (Jun. 2015).
3GPP TS 36.213 V12.5.0 (Mar. 2015).

* cited by examiner

DEVICE AND METHOD OF HANDLING COMMUNICATION OPERATION

CROSS REFERENCE TO RELATED APPLICATIONS

This application claims the benefit of U.S. Provisional Application No. 62/257,739, filed on Nov. 20, 2015, which is incorporated herein by reference.

BACKGROUND OF THE INVENTION

1. Field of the Invention

The present invention relates to a communication device and a method used in a wireless communication system, and more particularly, to a communication device and method of handling a communication operation in a wireless communication system.

2. Description of the Prior Art

Latency reduction is considered as a target for improving user experience regarding a wireless communication system. Latency reduction may be realized by shortening a transmission time interval (TTI) defined in the 3rd Generation Partnership Project (3GPP) standard to a shorter TTI. However, it is still unknown how to transmit/receive a shortened subframe with the shorter TTI. Thus, the shortened subframe with the shorter TTI may not be transmitted/received properly. As a result, resource(s) cannot be exploited efficiently, and scheduling performance is degraded.

Thus, how to handle a communication operation is an important problem to be solved.

SUMMARY OF THE INVENTION

The present invention therefore provides a method and related communication device for handling a communication operation to solve the abovementioned problem.

A network of handling a communication operation comprises a storage unit for storing instructions and a processing circuit coupled to the storage unit. The processing means is configured to execute the instructions stored in the storage unit. The instructions comprise transmitting a duration of a subframe of a first type to a communication device; transmitting a multiplexing scheme for the subframe of the first type and a subframe of a second type to the communication device, wherein the duration of the subframe of the first type is shorter than a duration of the subframe of the second type; determining a duration of a subframe of a third type, wherein the duration of the subframe of the second type is not an integral multiple of the duration of the subframe of the first type; transmitting the duration of the subframe of the third type to the communication device; and performing the communication operation with the communication device in a plurality of subframes of the first type in at least one subframe of the third type according to the multiplexing scheme via a physical channel.

A communication device of handling a communication operation comprises a storage unit for storing instructions and a processing circuit coupled to the storage unit. The processing means is configured to execute the instructions stored in the storage unit. The instructions comprise receiving a duration of a subframe of a first type from a network; receiving a multiplexing scheme for the subframe of the first type and a subframe of a second type from the network, wherein the duration of the subframe of the first type is shorter than a duration of the subframe of the second type; receiving a duration of a subframe of a third type from the network, wherein the duration of the subframe of the second type is not an integral multiple of the duration of the subframe of the first type; and performing the communication operation in a plurality of subframes of the first type of at least one subframe of the third type according to the multiplexing scheme via a physical channel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
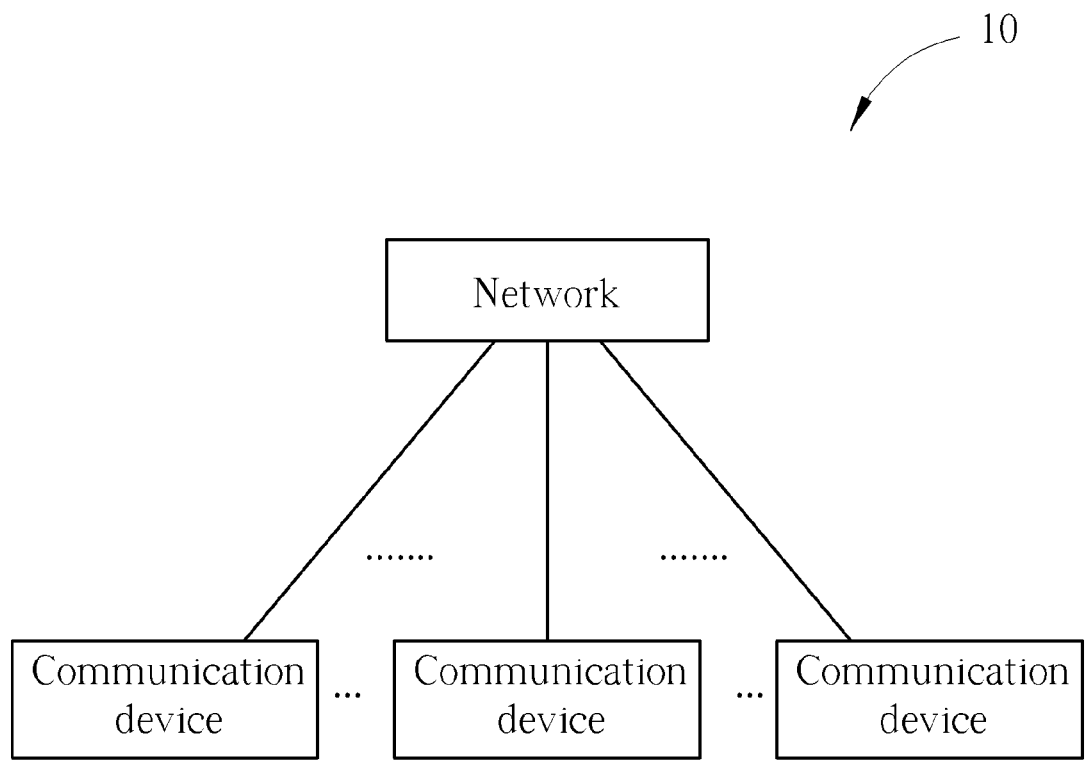
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be an evolved Node-B (eNB) in an evolved universal terrestrial radio access network (UTRAN) (E-UTRAN) of a long term evolution (LTE) system, or a fifth generation (5G) BS employing orthogonal frequency-division multiplexing (OFDM) and/or non-OFDM for communicating with the communication devices in a system bandwidth (e.g., 20 MHz) or a transmission time interval (TTI) (e.g., 1 ms).

The communication device may be a user equipment (UE), a mobile phone, a laptop, a tablet computer, an electronic book, a portable computer system, a vehicle or aircraft. In addition, the network and the communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
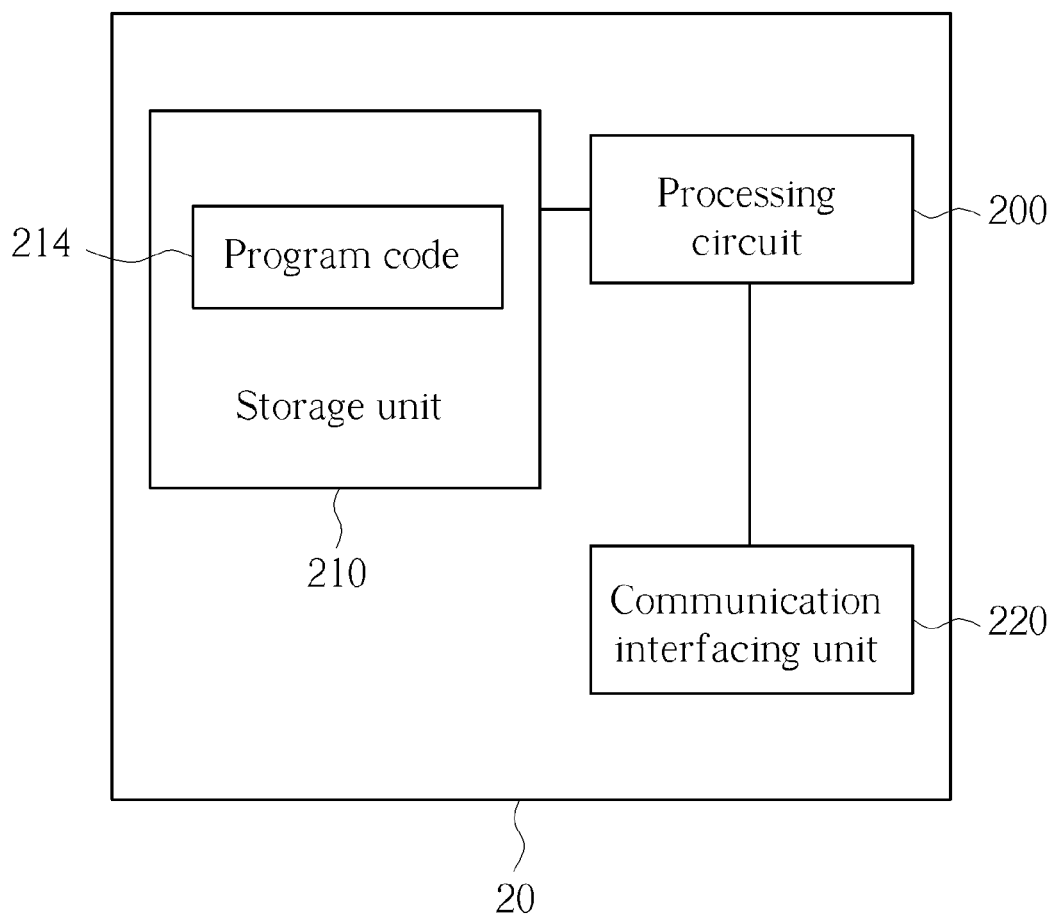
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent the communication device in FIG. 1, to simplify the illustration of the embodiments.

Figure 3:
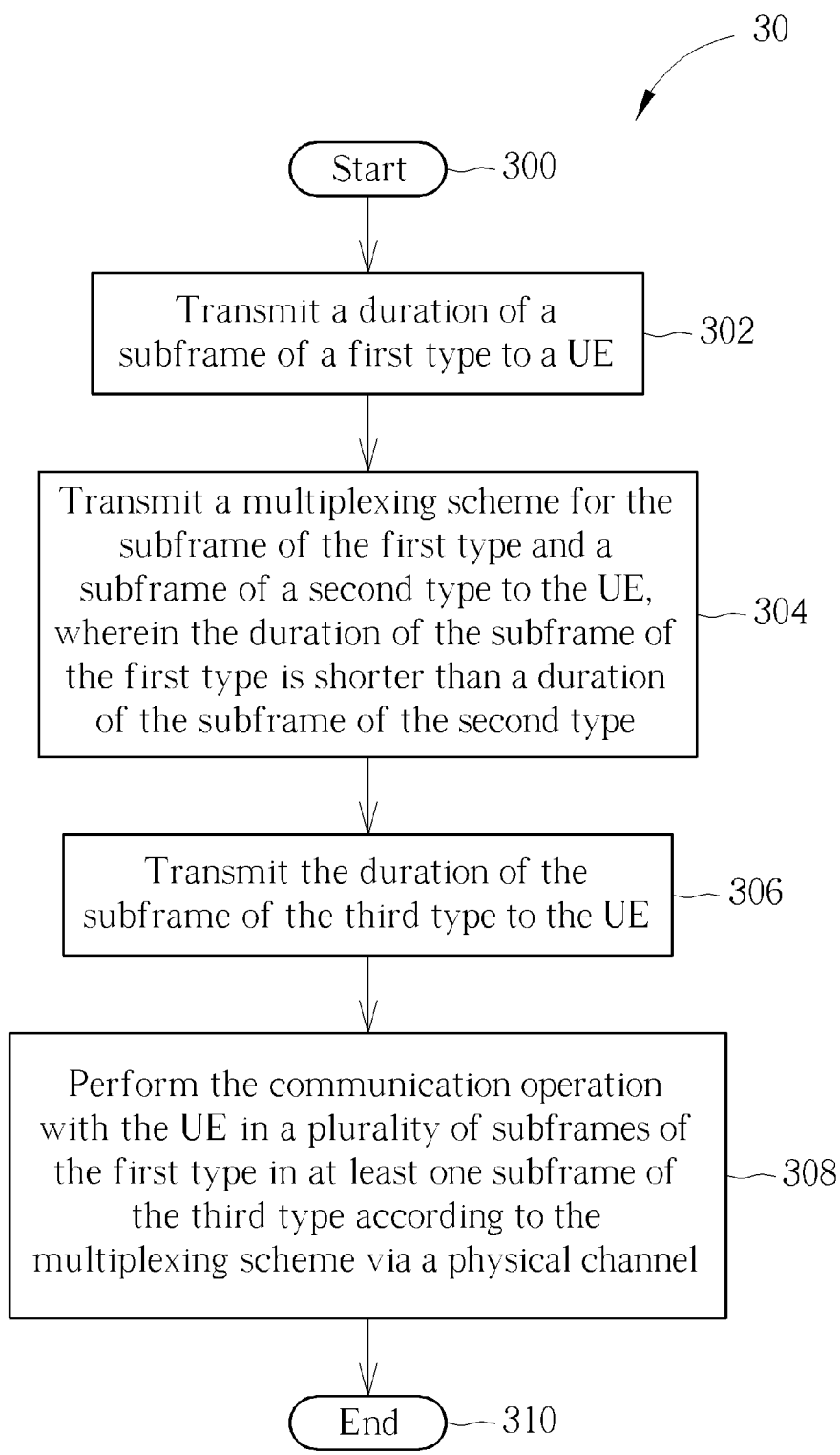
FIG. 3 is a flowchart of a process according to an example of the present invention.

FIG. 3 is a flowchart of a process 30 according to an example of the present invention. The process 30 may be utilized in a network, to handle a communication operation in a wireless communication system. The process 30 includes the following steps:

Step 300: Start.

Step 302: Transmit a duration of a subframe of a first type to a UE.

Step 304: Transmit a multiplexing scheme for the subframe of the first type and a subframe of a second type to the UE, wherein the duration of the subframe of the first type is shorter than a duration of the subframe of the second type.

Step 306: Determine a duration of a subframe of a third type, wherein the duration of the subframe of the second type is not an integral multiple of the duration of the subframe of the first type.

Step 308: Transmit the duration of the subframe of the third type to the UE.

Step 310: Perform the communication operation with the UE in a plurality of subframes of the first type in at least one subframe of the third type according to the multiplexing scheme via a physical channel.

Step 312: End.

According to the process 30, the network may transmit (e.g., configure) a duration of a subframe of a first type (e.g., a shorter TTI of a shortened subframe) to a UE, and may transmit (e.g., configure) a multiplexing scheme for the subframe of the first type and a subframe of a second type (e.g., a normal subframe defined in the 3rd Generation Partnership Project (3GPP)) to the UE, wherein the duration of the subframe of the first type is shorter than a duration of the subframe of the second type. Then, the network may determine a duration of a subframe of a third type, wherein the duration of the subframe of the second type is not an integral multiple of the duration of the subframe of the first type. Further, the network may transmit (e.g., signal) the duration of the subframe of the third type to the UE, and may perform the communication operation with the UE in a plurality of subframes of the first type in at least one subframe of the third type according to the multiplexing scheme via a physical channel. That is, the network determines the duration of the subframe of the third type and performs the communication operation with the UE according to the duration of the subframe of the third type, when the duration of the subframe of the second type is not an integral multiple of the duration of the subframe of the first type. In other words, the network and the UE handle the communication operation according to a duration of a subframe of a determined type, when types of subframes scheduled for a transmission/reception are not consistent. Thus, the scheduled subframes can be transmitted/received properly according to the process 30. As a result, the problem of the communication operation in the prior art is solved.

Realization of the process 30 is not limited to the above description.

In on example, the duration of the subframe of the first type may be transmitted in (e.g., signaled as) system information. For example, the duration of the subframe of the first type may be signaled as part of cell-specific system information. In one example, the duration of the subframe of the first type may be transmitted in (e.g., signaled as) a higher layer signaling or a dynamic signaling. For example, the duration of the subframe of the first type may be signaled as a UE-specific parameter via a higher layer or dynamically. Accordingly, different durations of different subframes of the first type may be signaled to different UEs. In one example, the duration of the subframe of the first type may be a predetermined duration newly defined in the 3GPP standard. It should be noted that, the network may not need to transmit the duration of the subframe of the first type to the UE in Step 302, since the duration of the subframe of the first type may be predetermined and is already known by the UE.

In on example, the multiplexing scheme may be a time-division multiplexing (TDM) scheme. Accordingly, the subframe of the first type may occupy entire system bandwidth. In on example, the multiplexing scheme may be a frequency-division multiplexing (FDM) scheme. Accordingly, the subframe of the first type may occupy a part of (e.g., fixed part of) entire system bandwidth and entire time (e.g., transmission) duration. In on example, the multiplexing scheme may be a hybrid multiplexing scheme. Accordingly, the subframe of the first type may occupy a part of (e.g., certain part of) entire system bandwidth and a non-precluded time (e.g., transmission) duration. That is, the multiplexing schemes mentioned above may be adapted (e.g., applied) to the subframe of the first type.

In on example, the multiplexing scheme may be a predetermined scheme newly defined in the 3GPP standard. In on example, the multiplexing scheme may be predetermined as a TDM for (e.g. between) physical DL control channel (PDCCH) and a physical DL shared channel (PDSCH). It should be noted that, the network may not need to transmit the multiplexing scheme to the UE in Step 304, since the multiplexing scheme may be predetermined and is already known by the UE. In on example, the multiplexing scheme may be signaled as a UE-specific parameter via a higher layer or dynamically. Accordingly, different durations of different subframes of the first type may be signaled to different UEs.

In on example, the duration of the subframe of the third type may be determined according to a time unit where the plurality of subframes of the first type are scheduled continuously. In one example, the time unit may be the number of a plurality of subframes of the second type.

Figure 4:
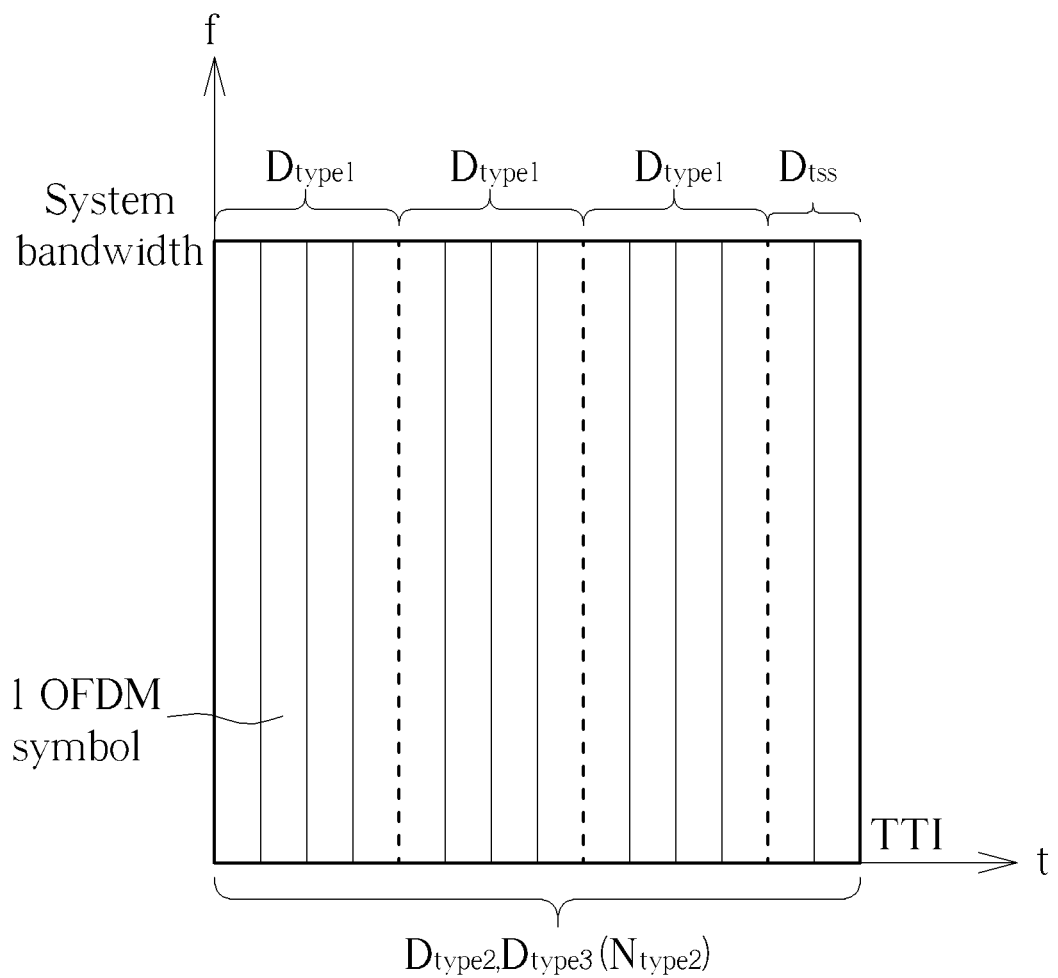
FIG. 4 is a schematic diagram of determination of the duration of the subframe of the third type according to an example of the present invention.

FIG. 4 is a schematic diagram of determination of the duration of the subframe of the third type according to an example of the present invention. In FIG. 4, X-axis represents a TTI for a time dimension, and Y-axis represents a system bandwidth for a frequency dimension. The duration of the subframe of the first type, the duration of the subframe of the second type, the number of the plurality of subframes of the second type, the duration of the subframe of the third type and a special shortened subframe are denoted as $D_{type1}$, $D_{type2}$, $N_{type2}$, $D_{type3}$ and $D_{tss}$, respectively. In the present example, the duration of the subframe of the first type is 4, i.e., $D_{type1}=4$ (OFDM symbols), and the duration of the subframe of the second type is 14 (OFDM symbols), i.e., $D_{type}=14$. Accordingly, 4 continuous subframes of the first type can be scheduled in 1 subframe of the second type, i.e., $N_{type2}=1$, wherein the last subframe of the continuous subframes is a special shortened subframe including only 2 OFDM symbols, i.e., $D_{tss}=2$ (OFDM symbols). Thus, the duration of the subframe of the third type can be determined as $D_{type3}=1$ according to $N_{type2}=1$.

Figure 5:
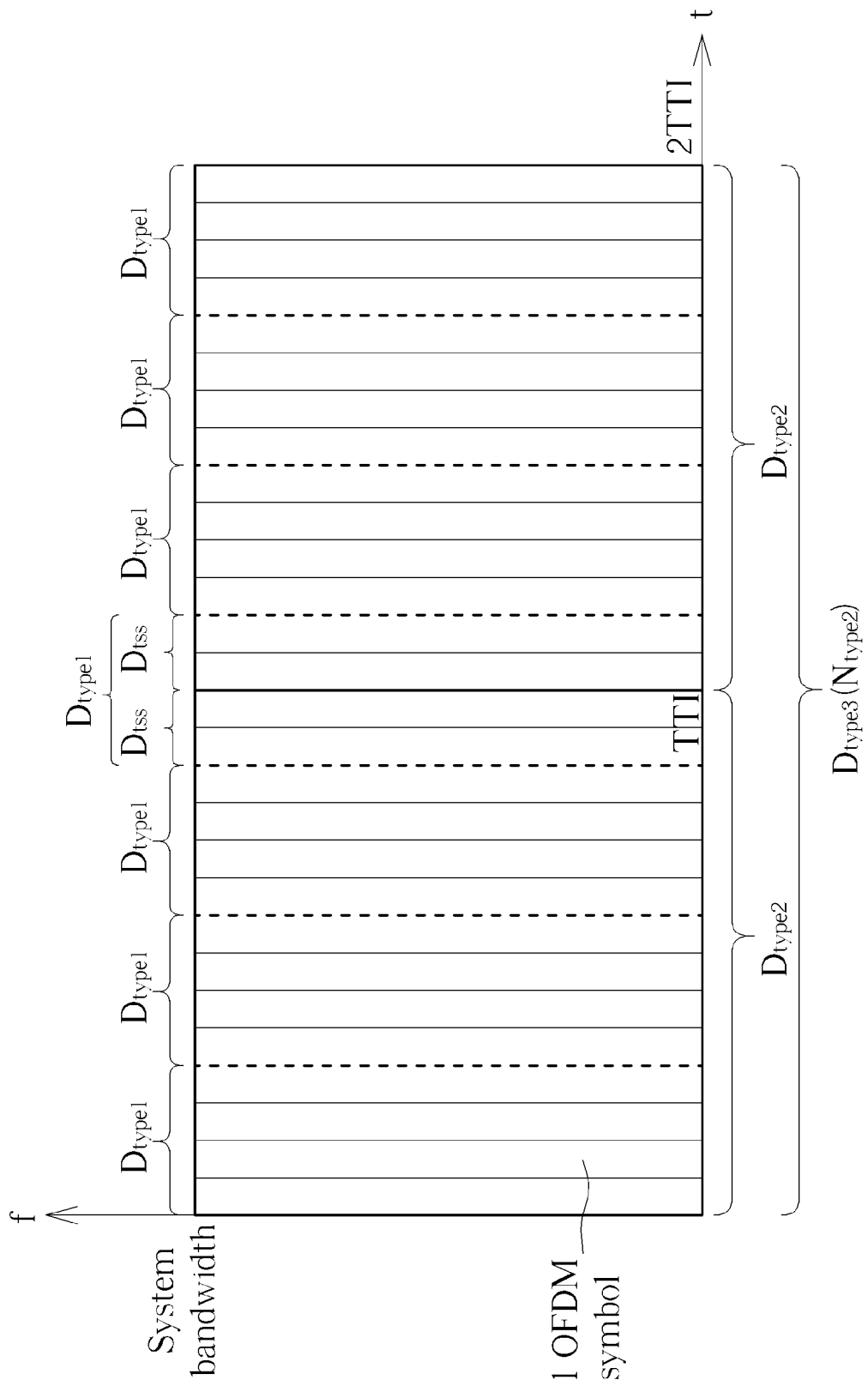
FIG. 5 is a schematic diagram of determination of the duration of the subframe of the third type according to an example of the present invention.

FIG. 5 is a schematic diagram of determination of the duration of the subframe of the third type according to an example of the present invention. In FIG. 5, X-axis represents 2 TTIs for a time dimension, and Y-axis represents a system bandwidth for a frequency dimension. The duration of the subframe of the first type, the duration of the subframe of the second type, the number of the plurality of subframes of the second type and the duration of the subframe of the third type are denoted as $D_{type1}$, $D_{type2}$, $N_{type2}$ and $D_{type3}$, respectively. In the present example, the duration of the subframe of the first type is 4, i.e., $D_{type1}=4$ (OFDM symbols), and the duration of the subframe of the second type is 14 (OFDM symbols), i.e., $D_{type2}=14$. Accordingly, 7 continuous subframes of the first type can be scheduled in 2 subframes of the second type, i.e., $N_{type2}=2$. Thus, the duration of the subframe of the third type can be determined as $D_{type3}=2$ according to $N_{type2}=2$.

In general, a PDCCH may be in the first subframe of the second type. In on example, the plurality of subframes of the first type may be scheduled continuously in the plurality of subframes of the second type of the at least one subframe of the third type, while skipping the PDCCH in the first subframe of the second type of the at least one subframe of the third type and/or skipping all PDCCHs in the following plurality of subframes of the second type of the at least one subframe of the third type. In on example, a duration of the PDCCH (e.g., represented in the number of OFDM symbols) for the following plurality of subframes of the second type may be predetermined (e.g., newly defined in the 3GPP standard) or may be transmitted in (e.g., signaling as) a higher layer signaling or a dynamic signaling.

In on example, the duration of the subframe of the third type may be determined according to a structure for scheduling the communication operation in the plurality of subframes of the first type. In on example, the duration of the subframe of the third type is independent from the multiplexing scheme for (e.g. between) the subframe of the first type and the subframe of the second type (e.g., TDM, FDM or hybrid multiplexing scheme). Accordingly, the subframe of the third type may be adapted (e.g., applied) to the multiplexing scheme for (e.g. between) the subframe of the first type and the subframe of the second type.

In on example, the duration of the subframe of the third type may be determined according to the duration of the subframe of the first type. In on example, the duration of the subframe of the third type may be determined according to at least one resource (e.g., dynamic DL resource and/or dynamic UL resource) for performing the communication operation. In on example, the duration of the subframe of the third type may be a UE-specific parameter.

In on example, the duration of the subframe of the third type may be determined according to a quotient of dividing the least common multiple (LCM) of the number of a plurality of OFDM symbols in the duration of the subframe of the second type and the number of a plurality of OFDM symbols in the duration of the subframe of the first type by the number of the plurality of OFDM symbols in the duration of the subframe of the second type.

Similarly, the duration of the subframe of the third type may be determined according to the example illustrated in FIG. 5. In the present example, the duration of the subframe of the first type is 4, i.e., $D_{type1}=4$ (OFDM symbols), and the duration of the subframe of the second type is 14, i.e., $D_{type2}=14$ (OFDM symbols). Accordingly, the LCM of $D_{type2}$ and $D_{type1}$ is 28. Thus, the duration of the subframe of the third type can be determined as $D_{type3}=2$ (i.e., 2 continuous subframes of the second type), since a quotient of dividing 28 by 14 is 2.

Figure 6:
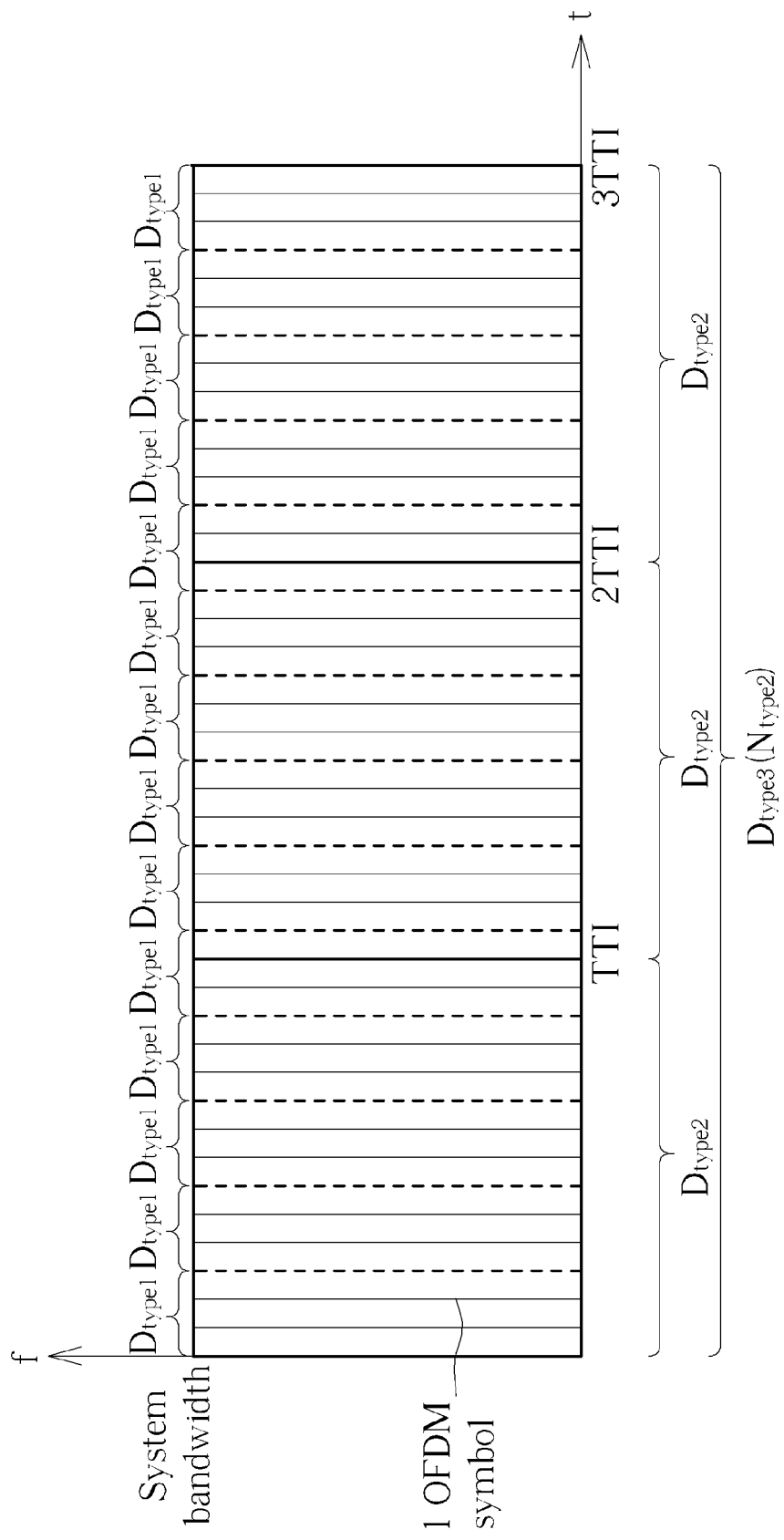
FIG. 6 is a schematic diagram of determination of the duration of the subframe of the third type according to an example of the present invention.

FIG. 6 is a schematic diagram of determination of the duration of the subframe of the third type according to an example of the present invention. In FIG. 6, X-axis represents 3 TTIs for a time dimension, and Y-axis represents a system bandwidth for a frequency dimension. The duration of the subframe of the first type, the duration of the subframe of the second type and the duration of the subframe of the third type are denoted as $D_{type1}$, $D_{type2}$ and $D_{type3}$, respectively. In the present example, the duration of the subframe of the first type is 3, i.e., $D_{type1}=3$ (OFDM symbols), and the duration of the subframe of the second type is 14, i.e., $D_{type2}=14$ (OFDM symbols). Accordingly, the LCM of $D_{type2}$ and $D_{type1}$ is 42. Thus, the duration of the subframe of the third type can be determined as $D_{type3}=3$ (i.e., 3 continuous subframes of the second type), since a quotient of dividing 42 by 14 is 3.

In on example, the duration of the subframe of the third type is transmitted (e.g., signaled as a dynamic signaling) in a first subframe of the at least one subframe of the third type via the physical channel (e.g., PDCCH). In on example, the dynamic signaling may be transmitted to signal a start or an activation of the at least one subframe of the third type in the at least one resource (e.g., allocated time resource/frequency resource), when the duration of the subframe of the third type is determined according to the duration of the subframe of the first type. In on example, the dynamic signaling may not be transmitted (i.e., skipped) to signal the start of the at least one subframe of the third type. It should be noted that, the network and the UE may already know a subframe boundary where the plurality of subframes of the first type and the subframe of the second type are aligned. The start of the at least one subframe of the third type (i.e., a system frame number and the number of the at least one subframe of the third type) may be transmitted in (e.g. signaled as) a radio resource control (RRC) message (e.g., system information or a dedicated RRC message) to the UE, if the dynamic signaling is not transmitted (i.e., skipped) to signal the start of the at least one subframe of the third type to the UE. In one example, the network may not signal the duration of the subframe of the third type for the following subframes of the second type in the same at least one subframe of the third type after signaling the duration of the subframe of the third type to the UE, if the duration of the subframe of the third type is larger than 1.

In on example, the network may allocate at least one resource (e.g., time resource and/or frequency resource) for performing the communication operation in the plurality of subframes of the first type to the UE, wherein the at least one resource is in a cell-specific resource pool or a UE-specific resource pool. In one example, information of the at least one resource may be transmitted in (e.g., signaled as) a higher layer signaling or a dynamic signaling in the first subframe of the at least one subframe of the third type via the physical channel (e.g., PDCCH).

In on example, the at least one resource (e.g., time resource and/or frequency resource) may include a plurality of subframes of the second type, and the number of the plurality of subframes of the second type is an integral multiple of the duration of the subframe of the third type. For example, the at least one resource includes the plurality of subframes of the second type, and the number of the plurality of subframes of the second type is an integral multiple of 2, if the duration of the subframe of the third type is 2 subframes of the second type.

In on example, the network may schedule, the communication operation in the plurality of subframes of the first type, in a first subframe of the at least one subframe of the third type via the physical channel (e.g., PDCCH). That is, the communication operation in the plurality of subframes of the first type may be scheduled by using the physical channel (e.g., PDCCH) of the first subframe. In one example, another (e.g., scheduled) physical channel (e.g., PDSCH) for the ith subframe of the plurality of subframes of the first type may start from an OFDM symbol number $K*(i-1)$ to $K*i-1$, wherein K is the number of OFDM symbols in the subframe of the first type.

In on example, the network may schedule, the communication operation in the plurality of subframes of the first type, in a first subframe of the at least one subframe of the third type via a newly defined physical channel (e.g., newly defined PDCCH). That is, the communication operation in the plurality of subframes of the first type may be scheduled by using the newly defined physical channel (e.g., newly defined PDCCH) of the first subframe. In one example, the newly defined physical channel (e.g., newly defined PDCCH) may be allocated at a start of each one of the plurality of subframes of the first type, i.e., at an OFDM symbol number $K*(i-1)$. In one example, the newly defined physical channel (e.g., newly defined PDCCH) for the ith subframe of the plurality of subframes of the first type may be allocate with another newly defined (e.g., shortened) physical channel (e.g., PDSCH) from an OFDM symbol number $K*(i-1)$ to $K*i-1$ via a FDM. A method for multiplexing the newly defined physical channels (e.g., newly defined PDCCH and PDSCH) is not limited herein. In one example, the newly defined PDCCH may only schedule a single newly defined PDSCH in the same subframe of the first type.

In on example, the physical channel (e.g., PDCCH) or the newly defined physical channel (e.g., newly defined PDCCH) for scheduling the communication operation in the plurality of subframes of the first type may not be transmitted by the network, if at least one resource (e.g., time resource and/or frequency resource) for performing the communication operation in the plurality of subframes of the first type and/or the duration of the subframe of the third type is not transmitted (e.g., signaled) to the UE.

In on example, the network may receive a plurality of hybrid automatic repeat request (HARQ) feedbacks (e.g., ACK/NACK information) corresponding to the communication operation in the plurality of subframes of the first type in the at least one subframe of the third type. In one example, at most 4 HARQ feedbacks may be fed back from a scheduled UE without performing a Multi-input Multi-output (MIMO) transmission, if the duration of the subframe of the third type is 1 (i.e. 1 subframe of the second type) and the duration of the subframe of the first type is 4 OFDM symbols. The first 3 HARQ feedbacks may correspond to the first 3 subframes of the first type in the at least one subframe of the third type, respectively, and the last HARQ feedback may correspond to the special shortened subframe in the at least one subframe of the third type. In another example, at most 7 HARQ feedbacks may be fed back from a scheduled UE without performing the MIMO transmission, if the duration of the subframe of the third type is 2 (i.e. 2 continuous subframes of the second type) and the duration of the subframe of the first type is 4 OFDM symbols. In one example, the maximum number of HARQ feedbacks may be increased by a factor corresponding to the number of transmission layers, if a scheduled UE is capable of performing the MIMO transmission.

In on example, the network may receive another newly defined physical channel (e.g., newly defined physical UL control channel (PUCCH) and/or physical UL data channel (PUSCH)) in one of another plurality of subframes of the first type of at least one another subframe of the third type. In on example, the other newly defined physical channel (e.g., newly defined PUCCH) for the ith subframe of the plurality of subframes of the first type may start from an OFDM symbol number $K*(i-1)$ to $K*i-1$, wherein K is the number of OFDM symbols in the subframe of the first type.

An example is illustrated as follows according to the process 30. A duration of a subframe of the first type is signaled via a higher layer to a particular UE by the network, wherein the duration of the subframe of the first type is 4 OFDM symbols. A duration of a subframe of the second type is determined according to a predetermined duration defined in the 3GPP standard, wherein the duration of the subframe of the second type is 14 OFDM symbols. A duration of a subframe of the third type is determined (e.g., predetermined) according to a quotient of dividing the LCM of the number of a plurality of OFDM symbols in a duration of a subframe of a second type and the number of a plurality of OFDM symbols in the duration of the subframe of the first type by the number of the plurality of OFDM symbols in the duration of the subframe of the second type. Accordingly, the duration of the subframe of the third type is 2. A multiplexing scheme for the subframe of the first type and the subframe of the second type is a FDM defined in the 3GPP standard. The network signals an allocated system BW for the subframe of the first type to the UE via a higher layer signaling. The network signals a start of a plurality of subframe of the first type scheduled to the UE in a PDCCH of the first subframe in the subframe of the third type via a dynamic control signaling. The network transmits shortened control signals and/or shortened data signals to the UE in 7 subframes of the first type, which equals (e.g., corresponds) to 2 subframes of the second type. The network may continuously transmit the shortened control signals and/or the shortened data signals by using another plurality of subframes of the first type to the UE without signaling additional information of the subframe of the third type, unless a changing of configuration occurs. A new set of information corresponding to the duration of subframe of the first type and the associated time resources and/or frequency resources in a resource pool are signaled to the UE when the changing of configuration occurs. The rest of operations can be referred to the process 30, and is not narrated herein.

Figure 7:
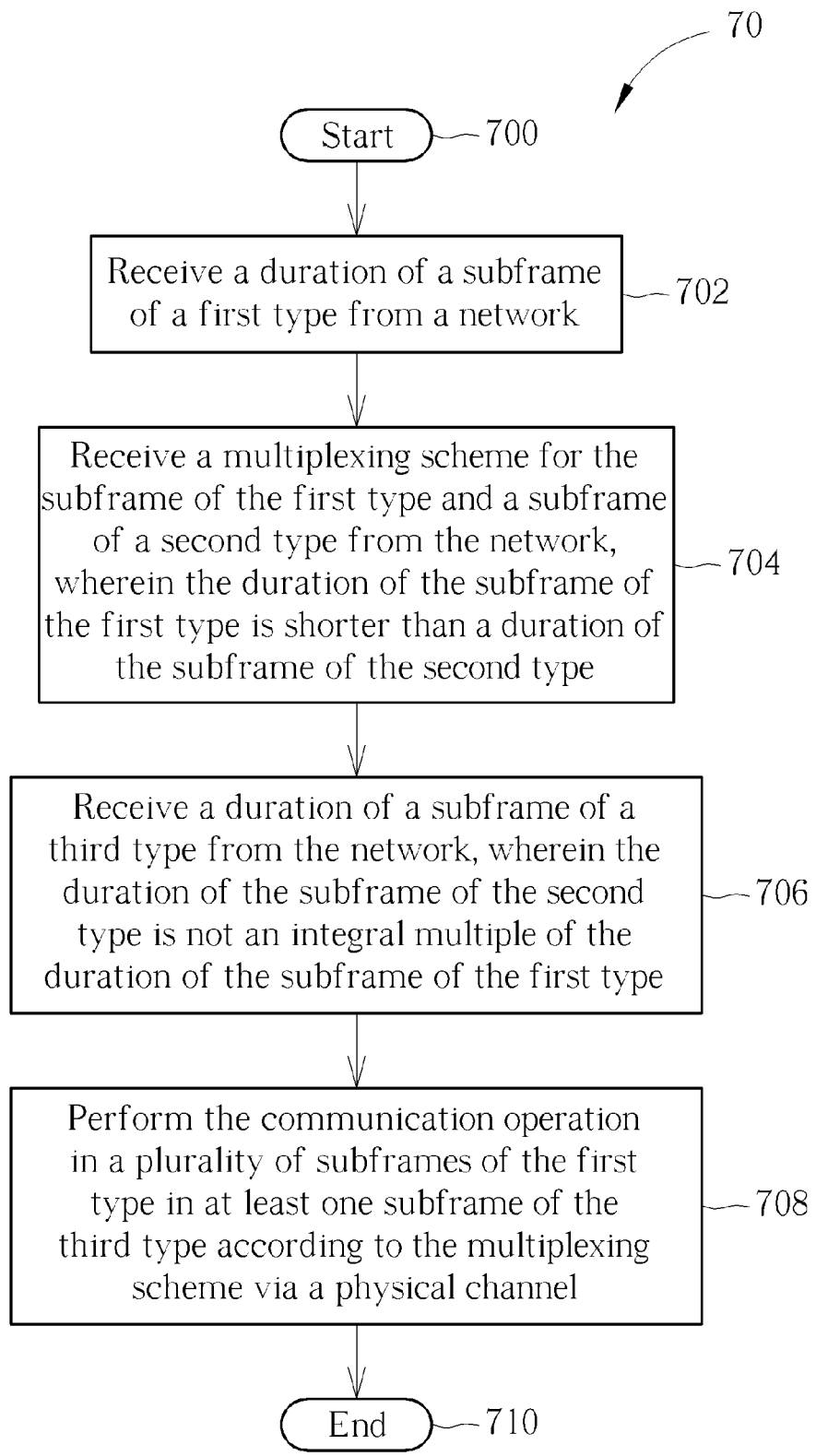
FIG. 7 is a flowchart of a process according to an example of the present invention.

FIG. 7 is a flowchart of a process 70 according to an example of the present invention. The process 70 may be utilized in a UE, to handle a communication operation in a wireless communication system. The process 70 includes the following steps:

Step 700: Start.

Step 702: Receive a duration of a subframe of a first type from a network.

Step 704: Receive a multiplexing scheme for the subframe of the first type and a subframe of a second type from the network, wherein the duration of the subframe of the first type is shorter than a duration of the subframe of the second type.

Step 706: Receive a duration of a subframe of a third type from the network, wherein the duration of the subframe of the second type is not an integral multiple of the duration of the subframe of the first type.

Step 708: Perform the communication operation in a plurality of subframes of the first type in at least one subframe of the third type according to the multiplexing scheme via a physical channel.

Step 710: End.

According to the process 70, the UE may receive a duration of a subframe of a first type (e.g., a shorter TTI of a shortened subframe) from a network, and may receive a multiplexing scheme for the subframe of the first type and a subframe of a second type (e.g., a normal subframe defined in the 3GPP standard) from the network, wherein the duration of the subframe of the first type is shorter than a duration of the subframe of the second type. Then, the UE may receive a duration of a subframe of a third type from the network, wherein the duration of the subframe of the second type is not an integral multiple of the duration of the subframe of the first type. Further, the UE may perform the communication operation in a plurality of subframes of the first type of at least one subframe of the third type according to the multiplexing scheme via a physical channel. That is, the UE receives the duration of the subframe of the third type and perform the communication operation with the network according to the duration of the subframe of the third type, when the duration of the subframe of the second type is not an integral multiple of the duration of the subframe of the first type. In other words, the network and the UE handle the communication operation according to a duration of a subframe of a determined type, when types of subframes scheduled for a transmission/reception are not consistent. Thus, the scheduled subframes can be transmitted/received properly according to the process 70. As a result, the problem of the communication operation in the prior art is solved.

Realization of the process 70 is not limited to the above description.

In on example, the duration of the subframe of the first type may be received in (e.g., signaled as) system information. For example, the duration of the subframe of the first type may be received as part of cell-specific system information. In one example, the duration of the subframe of the first type may be received in (e.g., signaled as) a higher layer signaling or a dynamic signaling. For example, the duration of the subframe of the first type may be received as a UE-specific parameter via a higher layer or dynamically. In one example, the duration of the subframe of the first type may be a predetermined duration newly defined in the 3GPP standard. It should be noted that, the UE may not need to receive the duration of the subframe of the first type to the UE in Step 702, since the duration of the subframe of the first type may be predetermined and is already known by the UE.

In on example, the multiplexing scheme may be a TDM scheme. Accordingly, the subframe of the first type may occupy entire system bandwidth. In on example, the multiplexing scheme may be a FDM scheme. Accordingly, the subframe of the first type may occupy a part of (e.g., fixed part of) entire system bandwidth and entire time (e.g., transmission) duration. In on example, the multiplexing scheme may be a hybrid multiplexing scheme. Accordingly, the subframe of the first type may occupy a part of (e.g., certain part of) entire system bandwidth and a non-precluded time (e.g., transmission) duration. That is, all the multiplexing schemes mentioned above may be adapted (e.g., applied) to the subframe of the first type.

In on example, the multiplexing scheme may be a predetermined scheme newly defined in the 3GPP standard. In on example, the multiplexing scheme may be predetermined as a TDM for (e.g. between) PDCCH and a PDCCH. It should be noted that, the UE may not need to receive the multiplexing scheme from the network in Step 604, since the multiplexing scheme may be predetermined and is already known by the UE. In on example, the multiplexing scheme may be signaled as a UE-specific parameter via a higher layer or dynamically.

In on example, the duration of the subframe of the third type may be determined according to a time unit where the plurality of subframes of the first type are scheduled continuously. In one example, the time unit may be the number of a plurality of subframes of the second type. The present example can be illustrated by using FIGS. 4, 5, and is not narrated herein.

In general, a PDCCH may be in the first subframe of the second type. In on example, the plurality of subframes of the first type may be scheduled continuously in the plurality of subframes of the second type of the at least one subframe of the third type, while skipping the PDCCH in the first subframe of the second type of the at least one subframe of the third type and/or skipping all PDCCHs in the following plurality of subframes of the second type of the at least one subframe of the third type. In on example, a duration of the PDCCH (e.g., represented in the number of OFDM symbols) for the following plurality of subframes of the second type may be predetermined (e.g., newly defined in the 3GPP standard) or may be received in a higher layer signaling or a dynamic signaling.

In on example, the duration of the subframe of the third type may be a structure for scheduling the communication operation in the plurality of subframes of the first type. In on example, the duration of the subframe of the third type is independent from the multiplexing scheme for (e.g. between) the subframe of the first type and the subframe of the second type (e.g., TDM, FDM or hybrid multiplexing scheme). Accordingly, the subframe of the third type may be adapted (e.g., applied) to the multiplexing scheme for (e.g. between) the subframe of the first type and the subframe of the second type.

In on example, the duration of the subframe of the third type may be determined according to the duration of the subframe of the first type. It should be noted that, the UE may not need to receive (i.e., skip) the duration of the subframe of the third type from the network in Step 404, if the multiplexing scheme is predetermined (e.g., newly defined in the 3GPP standard). That is, the network and the UE may already know a subframe boundary where the subframe of the first type and the subframe of the second type are aligned. In on example, the duration of the subframe of the third type may be a UE-specific parameter received from the network.

In on example, the duration of the subframe of the third type may be a quotient of dividing the LCM of the number of a plurality of OFDM symbols in the duration of the subframe of the second type and the number of a plurality of OFDM symbols in the duration of the subframe of the first type by the number of the plurality of OFDM symbols in the duration of the subframe of the second type. The present example can be illustrated by using FIGS. 4, 5, and is not narrated herein.

In on example, the duration of the subframe of the third type is received in (e.g., signaled as) a first subframe of the at least one subframe of the third type via the physical channel (e.g., PDCCH). In on example, the dynamic signaling may be received to inform a start or an activation of the at least one subframe of the third type in the at least one resource (e.g., allocated time resource/frequency resource), when the duration of the subframe of the third type is determined according to the duration of the subframe of the first type. In on example, the start of the at least one subframe of the third type (i.e., a system frame number and a number of the at least one subframe of the third type) may be received in (e.g., signaled as) a RRC message (e.g. system information or a dedicated RRC message) by the UE, if the dynamic signaling is not received (i.e., skipped) by the UE. In one example, the UE may not receive (e.g., expect) the duration of the subframe of the third type for the following subframes of the second type in the same at least one subframe of the third type after receiving the duration of the subframe of the third type from the network, if the duration of the subframe of the third type is larger than 1.

In on example, the UE may receive at least one resource (e.g., time resource and/or frequency resource) for performing the communication operation in the plurality of subframes of the first type to the UE, wherein the at least one resource is in a cell-specific resource pool or a UE-specific resource pool. In one example, information of the at least one resource may be received in a higher layer signaling or a dynamic signaling in the first subframe of the at least one subframe of the third type via the physical channel (e.g., PDCCH).

In on example, the at least one resource (e.g., time resource and/or frequency resource) may include a plurality of subframes of the second type, and the number of the plurality of subframes of the second type is an integral multiple of the duration of the subframe of the third type. For example, the at least one resource includes the plurality of subframes of the second type, and the number of the plurality of subframes of the second type is an integral multiple of 2, if the duration of the subframe of the third type is 2 subframes of the second type.

In on example, the UE may receive information for scheduling the communication operation in the plurality of subframes of the first type in a first subframe of the at least one subframe of the third type via the physical channel (e.g., PDCCH). That is, the communication operation in the plurality of subframes of the first type may be scheduled by using the physical channel (e.g., PDCCH) of the first subframe. In one example, another (e.g., scheduled) physical channel (e.g., PDSCH) for the ith subframe of the plurality of subframes of the first type may start from an OFDM symbol number K*(i−1) to K*i−1, where K is the number of OFDM symbols in the subframe of the first type.

In on example, the UE may receive information for scheduling the communication operation in the plurality of subframes of the first type in a first subframe of the at least one subframe of the third type via a newly defined physical channel (e.g., newly defined PDCCH). That is, the communication operation in the plurality of subframes of the first type may be scheduled by using the newly defined physical channel (e.g., newly defined PDCCH) of the first subframe. In one example, the newly defined physical channel (e.g., newly defined PDCCH) may be allocated at a start of each one of the plurality of subframes of the first type, i.e., at an OFDM symbol number K*(i−1). In one example, the newly defined physical channel (e.g., newly defined PDCCH) for the ith subframe of the plurality of subframes of the first type may be allocate with another newly defined (e.g., shortened) physical channel (e.g., PDSCH) from an OFDM symbol number K*(i−1) to K*i−1 via a FDM. A method for multiplexing the newly defined physical channels (e.g., newly defined PDCCH and PDSCH) is not limited herein. In one example, the newly defined PDCCH may only schedule a single newly defined PDSCH in the same subframe of the first type.

In on example, the physical channel (e.g., PDCCH) or the newly defined physical channel (e.g., newly defined PDCCH) for scheduling the communication operation in the plurality of subframes of the first type may not be received (e.g., expected) by the UE, if at least one resource (e.g., time resource and/or frequency resource) for performing the communication operation in the plurality of subframes of the first type and/or the duration of the subframe of the third type is not received (e.g., expected) from the network.

In on example, the UE may transmit a plurality of HARQ feedbacks (e.g., ACK/NACK information) corresponding to the communication operation in the plurality of subframes of the first type in the at least one subframe of the third type. In one example, at most 4 HARQ feedbacks may be fed back by the UE without performing a MIMO transmission, if the duration of the subframe of the third type is 1 (i.e. 1 subframe of the second type) and the duration of the subframe of the first type is 4 OFDM symbols. The first 3 HARQ feedbacks may correspond to the first 3 subframes of the first type in the at least one subframe of the third type, respectively, and the last HARQ feedback may correspond to the special shortened subframe in the at least one subframe of the third type. In another example, at most 7 HARQ feedbacks may be fed back by the UE without performing the MIMO transmission, if the duration of the subframe of the third type is 2 (i.e. 2 continuous subframes of the second type) and the duration of the subframe of the first type is 4 OFDM symbols. In one example, the maximum number of HARQ feedbacks may be increased by a factor corresponding to the number of transmission layers, if the UE is capable of performing the MIMO transmission.

In on example, the UE may transmit another newly defined physical channel (e.g., newly defined PUCCH and/or PUSCH) in one of another plurality of subframes of the first type of at least one another subframe of the third type. In on example, the other newly defined physical channel (e.g., newly defined PUCCH) for the ith subframe of the plurality of subframes of the first type may start from OFDM symbol number K*(i−1) to K*i−1, wherein K is the number of OFDM symbols in the subframe of the first type.

An example is illustrated as follows according to the process 60. A duration of a subframe of the first type is received from the network, wherein the duration of the subframe of the first type is 4 OFDM symbols. A duration of a subframe of the second type is a predetermined duration defined in the 3GPP standard, wherein the duration of the subframe of the second type is 14 OFDM symbols. A duration of a subframe of the third type is determined (e.g., predetermined) by the network according to a quotient of dividing the LCM of the number of a plurality of OFDM symbols in a duration of a subframe of a second type and the number of a plurality of OFDM symbols in the duration of the subframe of the first type by the number of the plurality of OFDM symbols in the duration of the subframe of the second type and is received from the network. Accordingly, the duration of the subframe of the third type is 2. A multiplexing scheme for the subframe of the first type and the subframe of the second type is a FDM defined in the 3GPP standard. An allocated system BW for the subframe of the first type is received from the network via a higher layer signaling. A start of a plurality of subframe of the first type scheduled to the UE is received from the network in a PDCCH of the first subframe in the subframe of the third type via a dynamic control signaling. The UE receives shortened control signals and/or shortened data signals from the network in 7 subframes of the first type, which equals (e.g., corresponds) to 2 subframes of the second type. The UE may continuously receive the shortened control signals and/or the shortened data signals by using another plurality of subframes of the first type from the network without receiving additional information of the subframe of the third type, unless a changing of configuration occurs. A new set of information corresponding to the duration of subframe of the first type and the associated time resources and/or frequency resources in a resource pool are received from the network when the changing of configuration occurs. The rest of operations can be referred to the process 70, and is not narrated herein.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20.

To sum up, the present invention provides a method and related communication device for handling a communication operation. The network and the UE handle the communication operation according to a duration of a subframe of a determined type, when types of subframes scheduled for a transmission/reception are not consistent. Thus, the scheduled subframes can be transmitted/received properly according to the present invention. As a result, the problem of the communication operation in the prior art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) of a network of handling a communication operation, comprising:
    a storage device; and
    a processing circuit, coupled to the storage device, wherein the storage device stores, and the processing circuit is configured to execute instructions of:
    transmitting a first duration of a first type subframe to a communication device;
    transmitting a multiplexing scheme for the first type subframe and a second type subframe to the communication device, wherein the first duration of the first type subframe is shorter than a second duration of the second type subframe, and the second type subframe is a normal subframe defined in the 3rd Generation Partnership Project (3GPP);
    determining a third duration of a third type subframe, when the second duration of the second type subframe is not an integral multiple of the first duration of the first type subframe, wherein the third duration of the third type subframe is different from the first duration of the first type subframe and is different from the second duration of the second type subframe;
    transmitting the third duration of the third type subframe to the communication device; and
    performing the communication operation with the communication device in a plurality of first type subframes in at least one third type subframe according to the multiplexing scheme via a physical channel.

2. The BS of claim 1, wherein the first duration of the first type subframe is transmitted in system information, or is transmitted in a higher layer signaling or a dynamic signaling.

3. The BS of claim 1, wherein the third duration of the third type subframe is determined according to a time unit where the plurality of first type subframes are scheduled continuously.

4. The BS of claim 1, wherein the third duration of the third type subframe is determined according to a structure for scheduling the communication operation in the plurality of first type subframes, and is independent from the multiplexing scheme.

5. The BS of claim 1, wherein the third duration of the third type subframe is determined according to the first duration of the first type subframe, or is determined according to at least one resource for performing the communication operation.

6. The BS of claim 1, wherein the third duration of the third type subframe is determined according to a quotient of dividing the least common multiple of the number of a plurality of orthogonal frequency-division multiplexing (OFDM) symbols in the second duration of the second type subframe and the number of a plurality of OFDM symbols in the first duration of the first type subframe by the number of the plurality of OFDM symbols in the second duration of the second type subframe.

7. The BS of claim 1, wherein the third duration of the third type subframe is transmitted in a first subframe of the at least one third type subframe via the physical channel.

8. The BS of claim 1, wherein the instructions further comprise:
    allocating at least one resource for performing the communication operation in the plurality of first type subframes to the communication device, wherein the at least one resource is in a cell-specific resource pool or a user equipment (UE)-specific resource pool, wherein the at least one resource comprises a plurality of second type subframes, and the number of the plurality of second type subframes is an integral multiple of the third duration of the third type subframe.

9. The BS of claim 1, wherein the instruction of performing the communication operation in the plurality of first type subframes of the at least one third type subframe via the physical channel further comprises:
    scheduling, the communication operation in the plurality of first type subframes, in a first subframe of the at least one third type subframe via the physical channel or a newly defined physical channel, wherein the physical channel or the newly defined physical channel for scheduling the communication operation in the plurality of first type subframes is not transmitted by the BS, if at least one resource for performing the communication operation in the plurality of first type subframes and/or the third duration of the third type subframe is not transmitted to the communication device.

10. The BS of claim 1, wherein the instructions further comprise:

receiving a plurality of hybrid automatic repeat request (HARQ) feedbacks corresponding to the communication operation in the plurality of first type subframes in the at least one third type subframe.

11. A communication device of handling a communication operation, comprising:

a storage device; and a processing circuit, coupled to the storage device, wherein the storage device stores, and the processing circuit is configured to execute instructions of:

receiving a first duration of a first type subframe from a base station (BS) of a network;

receiving a multiplexing scheme for the first type subframe and a second type subframe from the BS, wherein the first duration of the first type subframe is shorter than a second duration of the second type subframe, and the second type subframe is a normal subframe defined in the 3rd Generation Partnership Project (3GPP);

receiving a third duration of a third type subframe from the BS, when the second duration of the second type subframe is not an integral multiple of the first duration of the first type subframe, wherein the third duration of the third type subframe is different from the first duration of the first type subframe and is different from the second duration of the second type subframe; and performing the communication operation in a plurality of the first type subframes in at least one third type subframe according to the multiplexing scheme via a physical channel.

12. The communication device of claim 11, wherein the first duration of the first type subframe is transmitted in system information, or is transmitted in a higher layer signaling or a dynamic signaling.

13. The communication device of claim 11, wherein the third duration of the third type subframe is a time unit where the plurality of first type subframes are scheduled continuously.

14. The communication device of claim 11, wherein the third duration of the third type subframe is a structure for scheduling the communication operation in the plurality of first type subframes, and is independent from the multiplexing scheme.

15. The communication device of claim 11, wherein the third duration of the third type subframe is determined according to the first duration of the first type subframe.

16. The communication device of claim 11, wherein the third duration of the third type subframe is a quotient of dividing the least common multiple of the number of a plurality of orthogonal frequency-division multiplexing (OFDM) symbols in the second duration of the second type subframe and the number of a plurality of OFDM symbols in the first duration of the first type subframe by the number of the plurality of OFDM symbols in the second duration of the second type subframe.

17. The communication device of claim 11, wherein the third duration of the third type subframe is received in a first subframe of the at least one third type subframe via the physical channel.

18. The communication device of claim 11, wherein the instructions further comprise:

receiving at least one resource for performing the communication operation in the plurality of the first type subframes from the BS, wherein the at least one resource in a cell-specific resource pool or a user equipment (UE)-specific resource pool, wherein the at least one resource comprises a plurality of the second type subframes, and the number of the plurality of the second type subframes is an integral multiple of the third duration of the third type subframe.

19. The communication device of claim 11, wherein the instruction of performing the communication operation in the plurality of the first type subframes in the at least one third type subframe via the physical channel further comprises:

receiving information for scheduling, the communication operation in the plurality of the first type subframes, in a first subframe of the at least one third type subframe via the physical channel or a newly defined physical channel, wherein the physical channel or the newly defined physical channel for scheduling the communication operation in the plurality of the first type subframes is not received by the communication device, if at least one resource for performing the communication operation in the plurality of the first type subframes and/or the third duration of the third type subframe is not received by the communication device.

20. The communication device of claim 11, wherein the instructions further comprise:

transmitting a plurality of hybrid automatic repeat request (HARQ) feedbacks corresponding to the communication operation in the plurality of the first type subframes in the at least one third type subframe.

* * * * *